US00RE38519E

(19) United States
(12) Reissued Patent
Doorhy et al.

(10) Patent Number: US RE38,519 E
(45) Date of Reissued Patent: May 18, 2004

(54) LOW CROSSTALK MODULAR COMMUNICATION CONNECTOR

(75) Inventors: Michael Doorhy, Mokena, IL (US); Andrew J. Stroede, Mokena, IL (US); Russell A. Vanderhoof, Minooka, IL (US)

(73) Assignee: Panduit Corp., Tinley Park, IL (US)

(21) Appl. No.: 10/215,087

(22) Filed: Aug. 9, 2002

Related U.S. Patent Documents

Reissue of:
(64) Patent No.: 6,371,793
Issued: Apr. 16, 2002
Appl. No.: 09/138,969
Filed: Aug. 24, 1998

(51) Int. Cl.[7] ..... H01R 4/24; H01R 4/26; H01R 11/20

(52) U.S. Cl. ..... 439/404; 439/941; 439/676; 439/405

(58) Field of Search ..... 439/404, 941, 439/676, 405

(56) References Cited

U.S. PATENT DOCUMENTS

| | | | | |
|---|---|---|---|---|
| 3,565,807 | A | 2/1971 | Siverisen et al. | 428/189 |
| 4,153,325 | A | 5/1979 | Asick | 439/405 |
| 4,392,701 | A | 7/1983 | Weidler | 439/76.1 |
| 4,409,608 | A | 10/1983 | Yoder | 357/51 |
| 4,651,340 | A | 3/1987 | Marson | 371/155 |
| 4,731,833 | A | 3/1988 | Gumb et al. | 379/399 |
| 4,756,695 | A | 7/1988 | Lane et al. | 439/76 |
| 4,767,338 | A | 8/1988 | Dennis et al. | 439/55 |
| 4,968,260 | A | 11/1990 | Ingalsbe | 439/76 |
| 4,975,078 | A | 12/1990 | Stroede et al. | 439/405 |
| 5,055,966 | A | 10/1991 | Smith et al. | 361/321 |
| 5,069,641 | A | 12/1991 | Sakamoto et al. | 439/620 |
| 5,091,826 | A | 2/1992 | Arnett et al. | 361/776 |
| 5,178,554 | A | 1/1993 | Siemon et al. | 439/188 |
| 5,295,869 | A | 3/1994 | Siemon et al. | 439/620 |
| 5,299,956 | A | 4/1994 | Brownell et al. | 439/638 |
| 5,326,284 | A | 7/1994 | Bohbot et al. | 439/676 |
| 5,399,106 | A | 3/1995 | Ferry | 439/620 |
| 5,414,393 | A | 5/1995 | Rose et al. | 333/1 |
| 5,431,584 | A | 7/1995 | Ferry | 439/620 |

(List continued on next page.)

FOREIGN PATENT DOCUMENTS

| | | |
|---|---|---|
| WO | WO 97/44862 | 11/1997 |

*Primary Examiner*—Javaid H. Nasri
(74) *Attorney, Agent, or Firm*—Oliff & Berridge, PLC

(57) ABSTRACT

A modular communications connector includes a housing defining a plug receiving opening, a conductor carrying sled including a printed circuit board designed in conjunction with the conductors to improve crosstalk performance. The connector includes a wire containment fixture arrangement allows for simplified field termination of the modular connector. The connector is assembled by loading the contacts and printed circuit board onto the sled, which is snap fit into the housing. Then, wires are positioned through the wire containment fixture and the fixture is slidably engaged with the sled at a first position and slid along the sled to a second position where the wires are terminated with IDCs mounted on the sled. The connector preferably includes first and second pluralities of conductors, with the second plurality each having IDC portions arranged in first and second rows of four IDCs. The top and bottom IDC portion at each end of the rows terminates an associated wire pair and the two internal IDC portions of each row terminates an associated wire pair. The connector also preferably includes a printed circuit board that is engageable with both the first and second plurality of conductors. The printed circuit board has at least three layers, with a pair of outer layers containing traces that complete an electrical path between the IDCs of the second plurality of conductors and a corresponding first end portion of the first plurality of conductors. One or more capacitors are provided on inner layer of the printed circuit board.

122 Claims, 11 Drawing Sheets

U.S. PATENT DOCUMENTS

| | | | | |
|---|---|---|---|---|
| 5,432,484 | A | 7/1995 | Klas et al. | 333/1 |
| 5,435,752 | A | 7/1995 | Siemon et al. | 439/620 |
| 5,488,201 | A | 1/1996 | Liu | 174/262 |
| 5,513,065 | A | 4/1996 | Caveney et al. | 361/311 |
| 5,577,937 | A | 11/1996 | Itoh et al. | 439/620 |
| 5,586,914 | A | 12/1996 | Foster, Jr. et al. | 439/676 |
| 5,636,099 | A | 6/1997 | Sugawara et al. | 361/278 |
| 5,679,027 | A | 10/1997 | Smith | 439/676 |
| 5,700,167 | A | 12/1997 | Pharney et al. | 439/676 |
| 5,716,237 | A | 2/1998 | Conorich et al. | 439/660 |
| 5,885,111 | A | 3/1999 | Yu | 439/676 |
| 6,102,741 | A | 8/2000 | Boutros et al. | 439/676 |
| 6,183,306 | B1 | 2/2001 | Caveney | 439/676 |

10
12
42
36
38
30
40
22
24
25
22
25
34
32
50

LOW CROSSTALK MODULAR COMMUNICATION CONNECTOR

Matter enclosed in heavy brackets [ ] appears in the original patent but forms no part of this reissue specification; matter printed in italics indicates the additions made by reissue.

TECHNICAL FIELD

The present invention relates to modular communication connectors and more particularly to a modular communication connector that utilizes a printed circuit board design and conductor arrangement to provide for improved crosstalk performance and also provides for simplified wire termination.

BACKGROUND OF THE INVENTION

Standard telephone jack connectors and other modular connectors of generally similar design are well known in the communications industry. However, along with the constantly increasing signal transmission rates exists the need for modular communication connectors to have improved crosstalk performance. It is also important for these connectors to continue to have simple field termination capability. Thus, increasing performance requirements for communication connectors establish a need in the art of modular communication connectors to be economically manufactured which can be easily field terminated and that will achieve higher levels of suppressing crosstalk interference.

SUMMARY OF THE INVENTION

It is an object of the present invention to provide a modular communication connector with improved crosstalk performance.

It is another object of the present invention to provide a modular communication connector with simplified field terminability.

In general, a modular communications connector, includes a housing defining a plug receiving opening, a conductor carrying sled supporting a plurality of conductors each including an insulation displacement contact (IDC) portion disposed extending rearwardly in a direction generally parallel to an axis of entry of the plug received opening; and a wire containment fixture having means for positioning wires with respect to the IDC portions, said fixture being engageable to and slidably movable along a portion of the conductor carrying sled. The connector also utilizes a printed circuit board design incorporating capacitors which in conjunction with the conductor design improves the overall crosstalk performance. The IDC portions of the conductors are arranged in upper and lower rows of four IDC portions each such that the top and bottom IDC portion at each end of the rows terminates a wire pair and the two internal IDC portions of each row terminates a wire pair and the printed circuit board includes at least three layers with the outer layers containing a plurality of traces for interconnecting the first and second plurality of conductors, and formed on an inner layer of the PCB for affecting the crosstalk performance of the conductor.

DESCRIPTION OF THE PREFERRED EMBODIMENT

Figure 1:
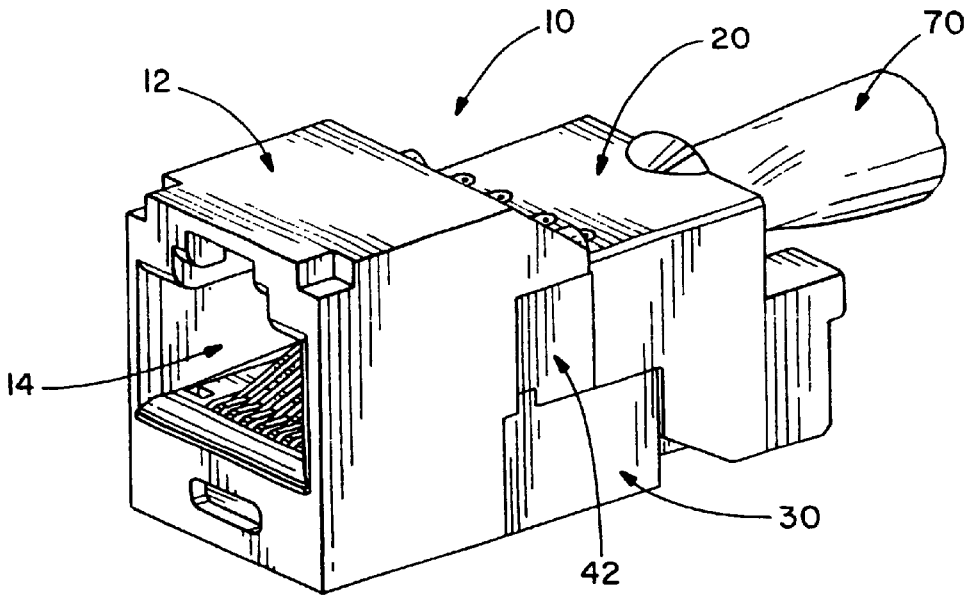
FIG. 1 is a front perspective view of a free standing modular communication connector embodying the concept of the present invention.
Figure 2:
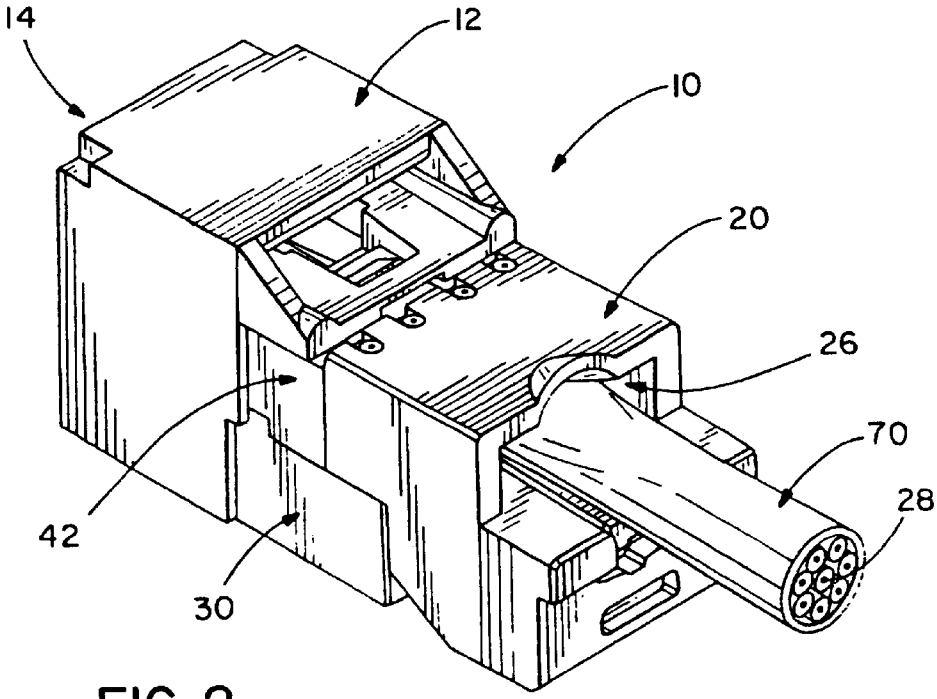
FIG. 2 is a rear perspective view of the connector of FIG. 1.
Figure 3:
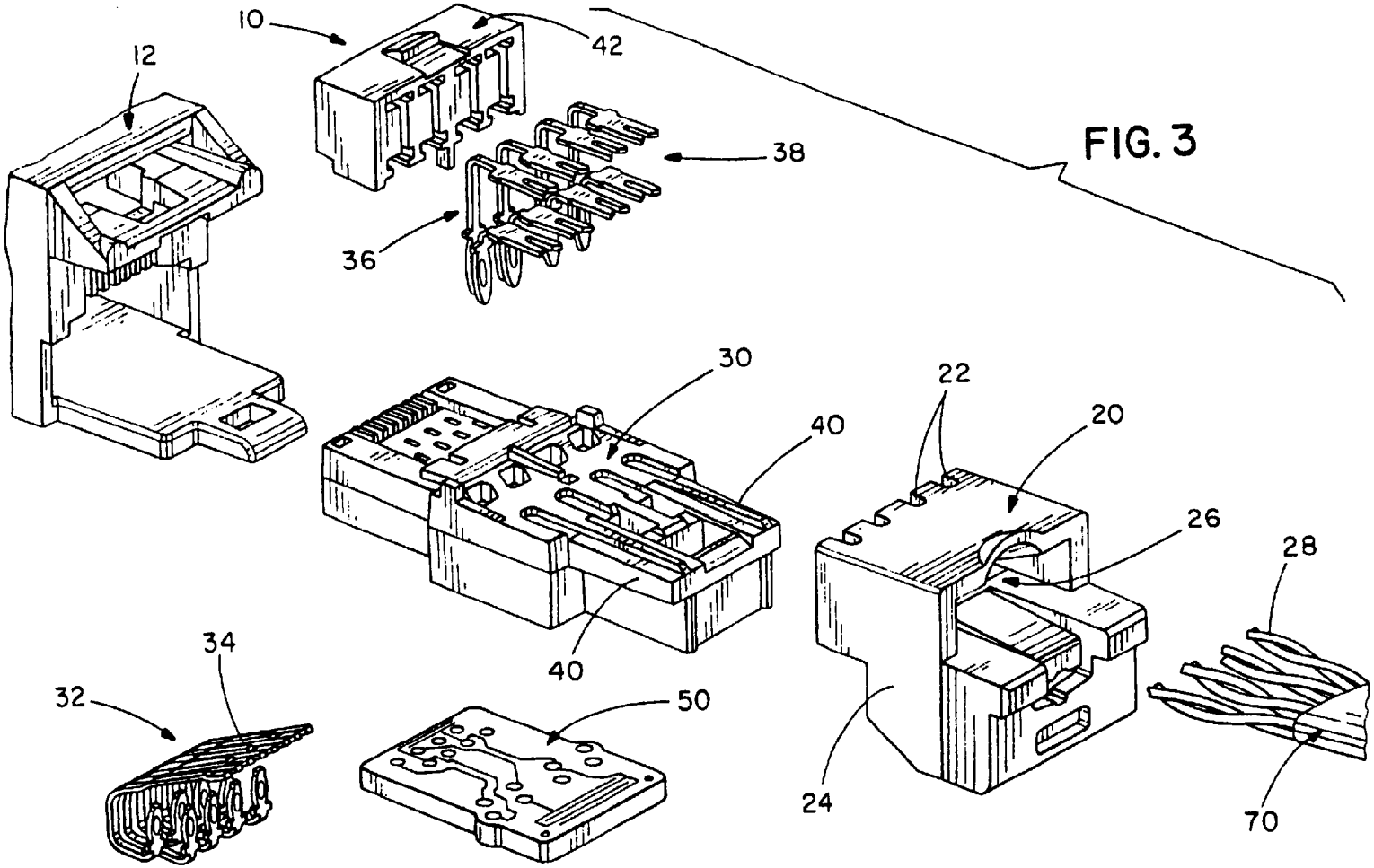
FIG. 3 is a rear perspective view of the connector of FIG. 1.
Figure 4:
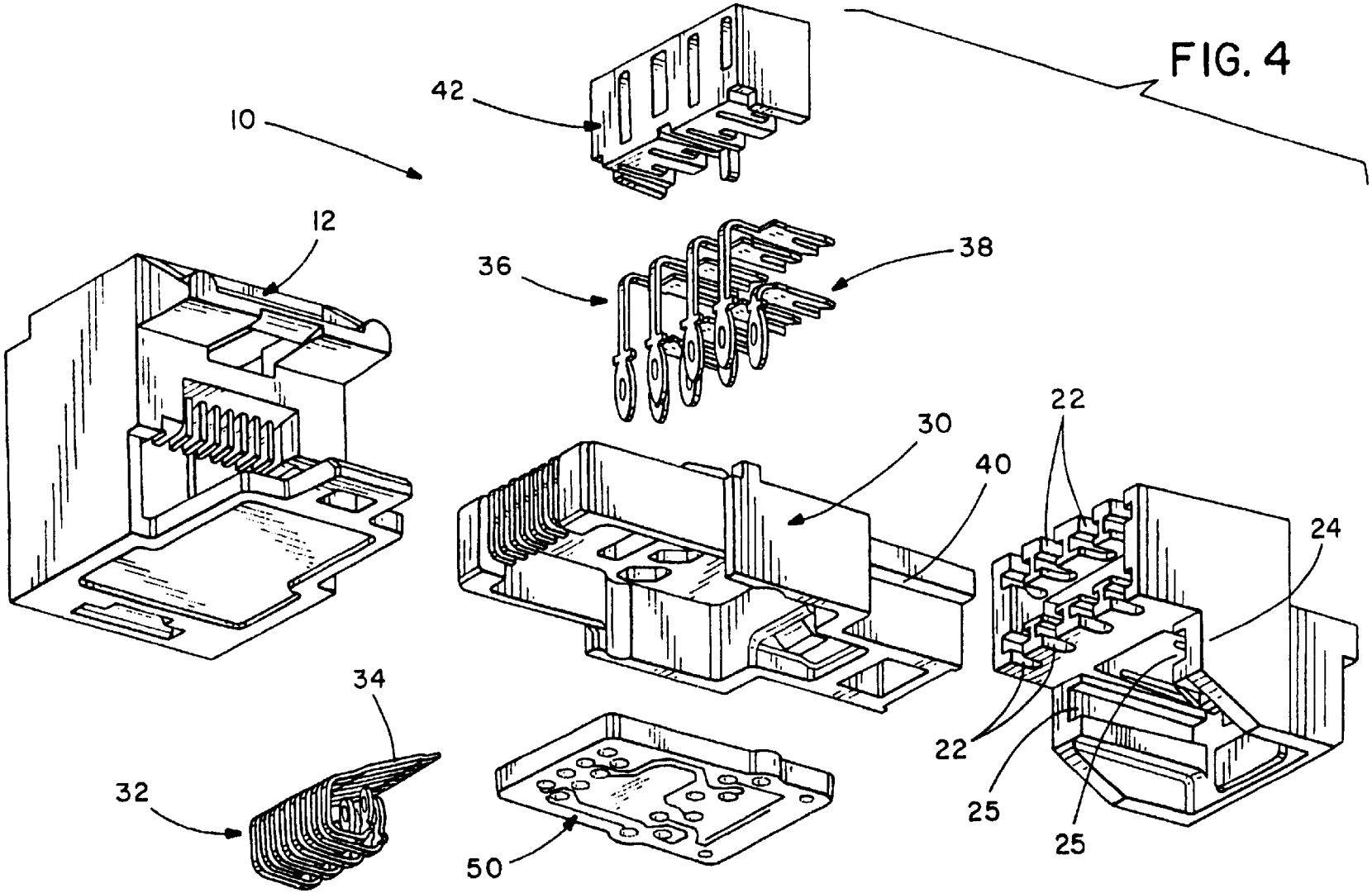
FIG. 4 is a bottom perspective exploded view of the connector of FIG. 1.
Figure 5:
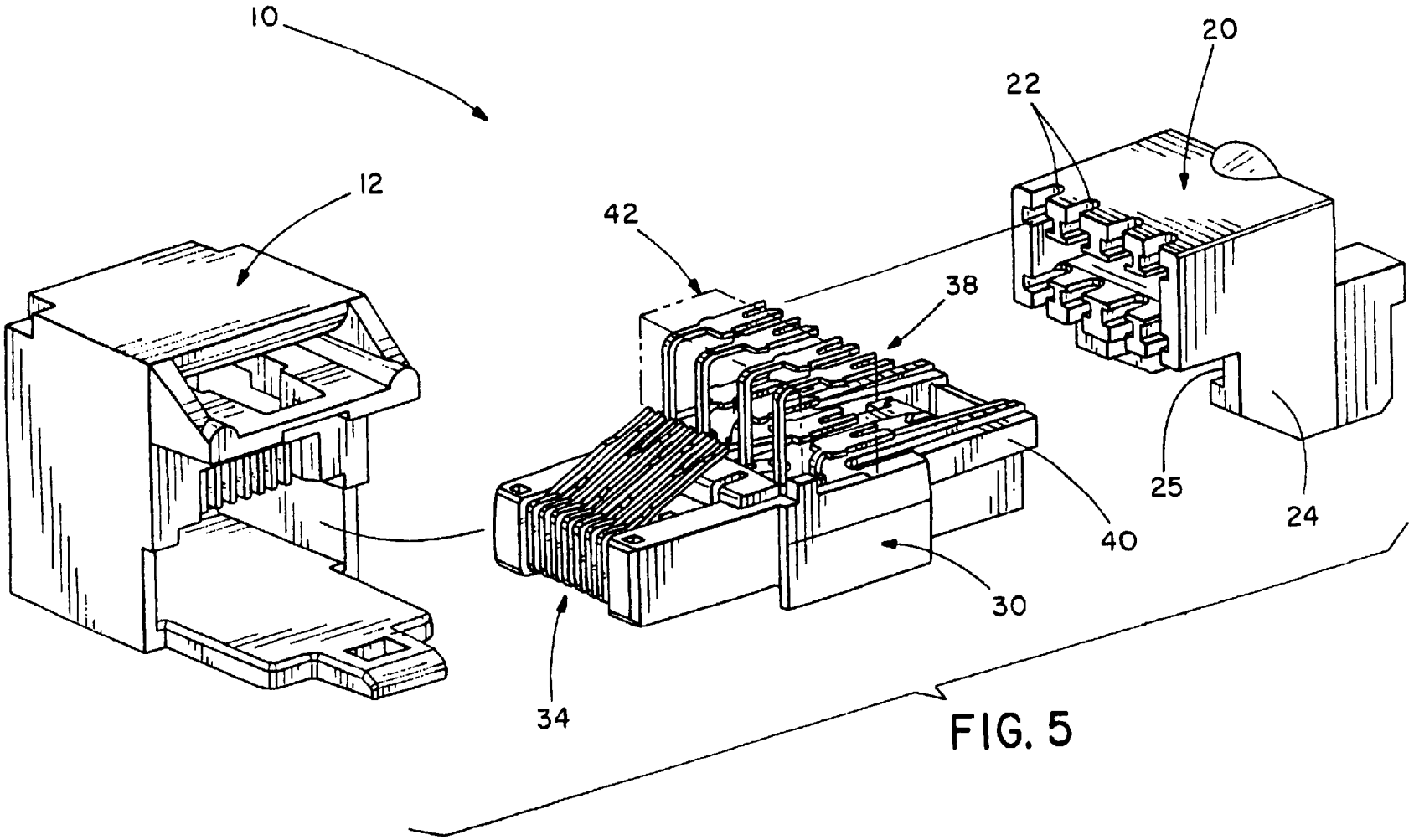
FIG. 5 is a subassembly view of the connector of FIG. 1 showing the sled prior to engagement with the housing.

A modular communication connector embodying the concept of the present invention is designated generally by the reference numeral 10 in the accompanying drawings. As shown in FIGS. 1 and 2, connector 10 includes a housing 12 defining a plug receiving opening 14, a conductor carrying sled 30 and a wire containment fixture 20 for terminating a communication cable 70 having a plurality of individual communication wires 28.

Figure 8:
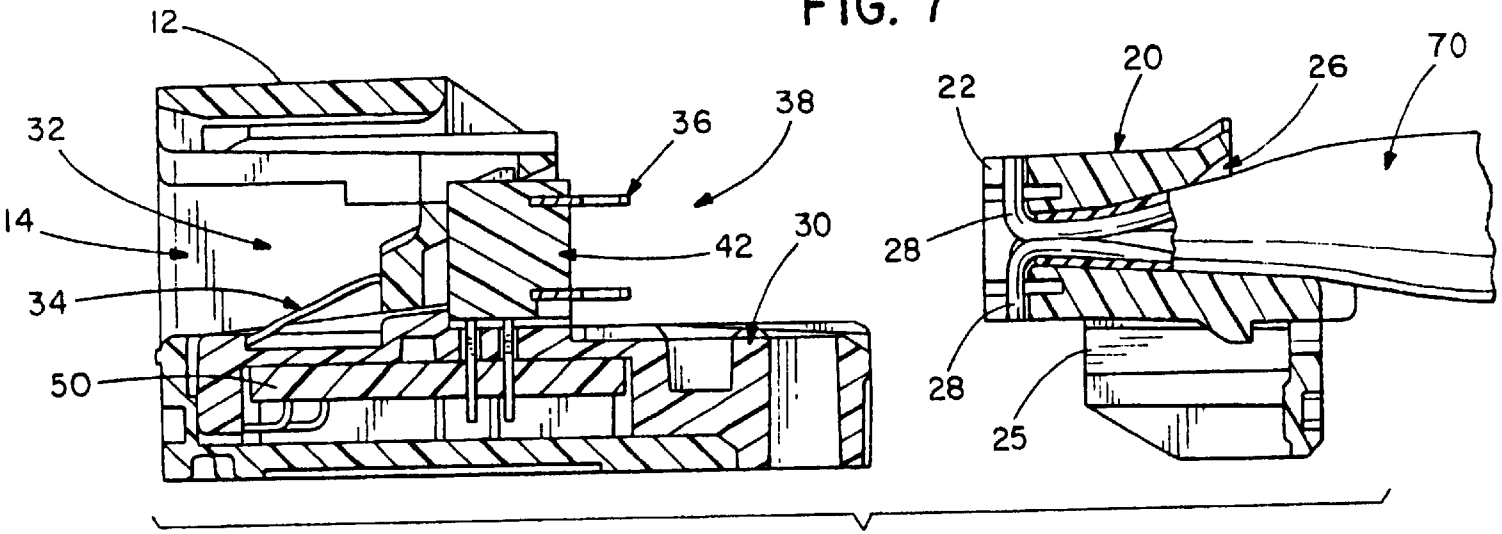
FIG. 8 is a sectional view taken along line 8—8 of FIG. 7.
Figure 9:
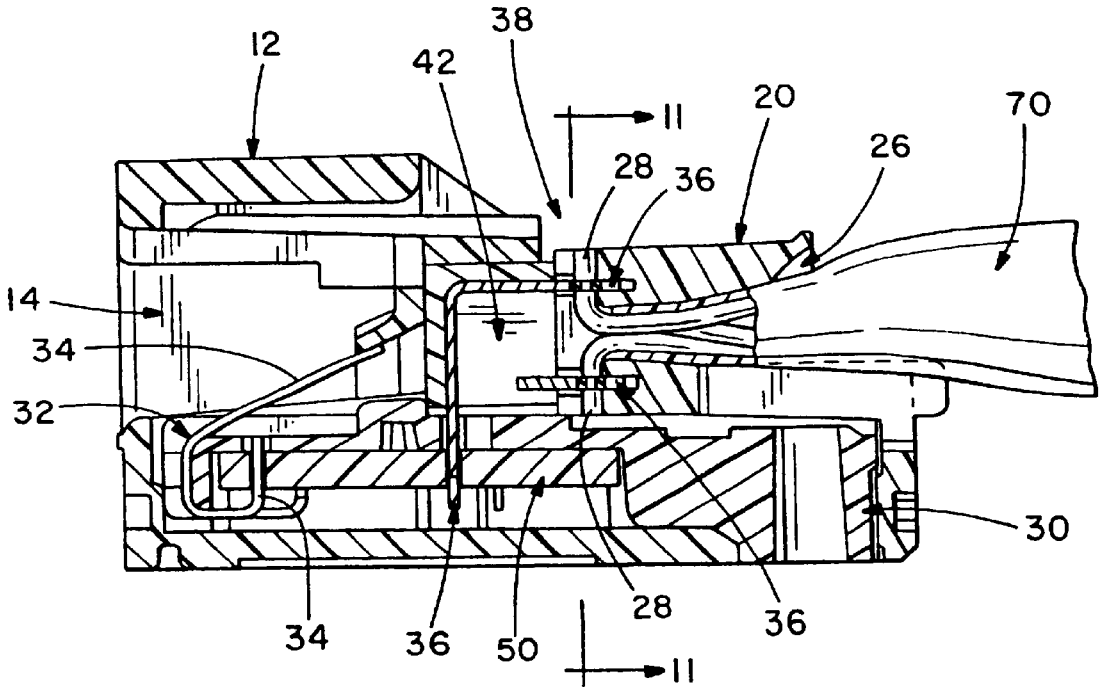
FIG. 9 is a sectional view taken along line 9—9 of FIG. 7.
Figure 10:
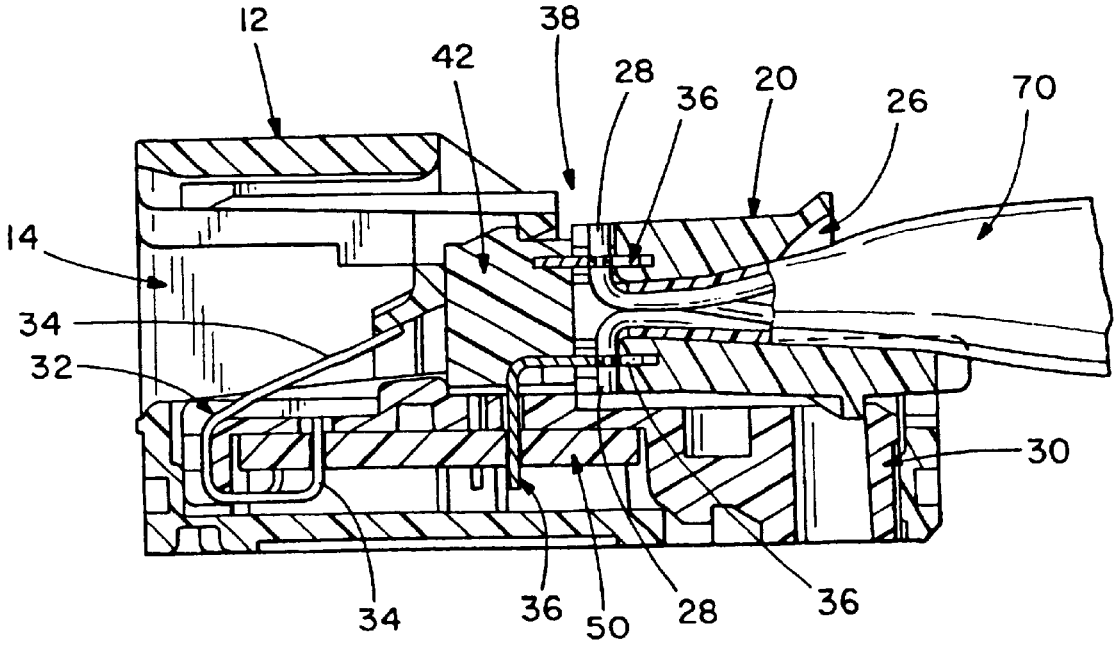
FIG. 10 is a sectional view taken along lines 10—10 of FIG. 7.
Figure 11:
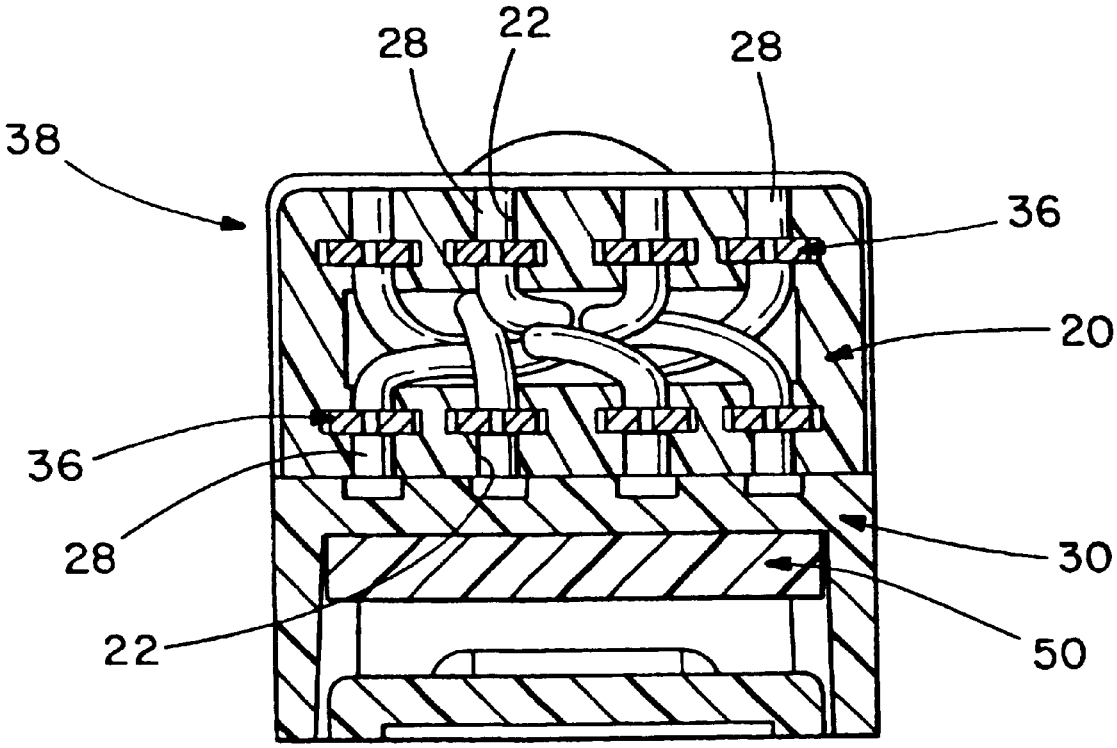
FIG. 11 is a sectional view taken along lines 11—11 of FIG. 9.
Figure 12:
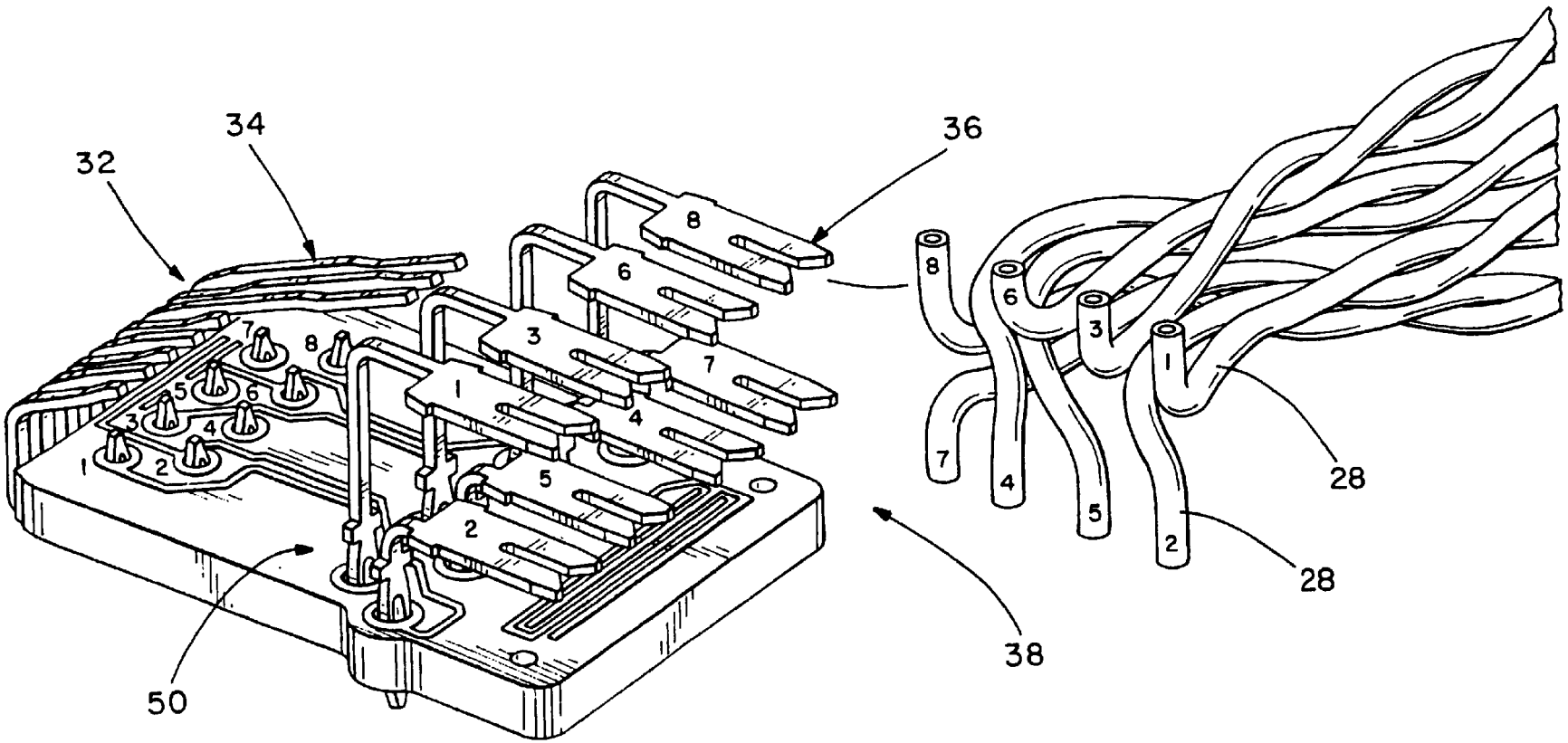
FIG. 12 is a perspective view of the twisted wire pairs shown without the wire containment fixture and the contact arrangement of the PCB shown without the housing, sled and IDC block.
Figure 15:
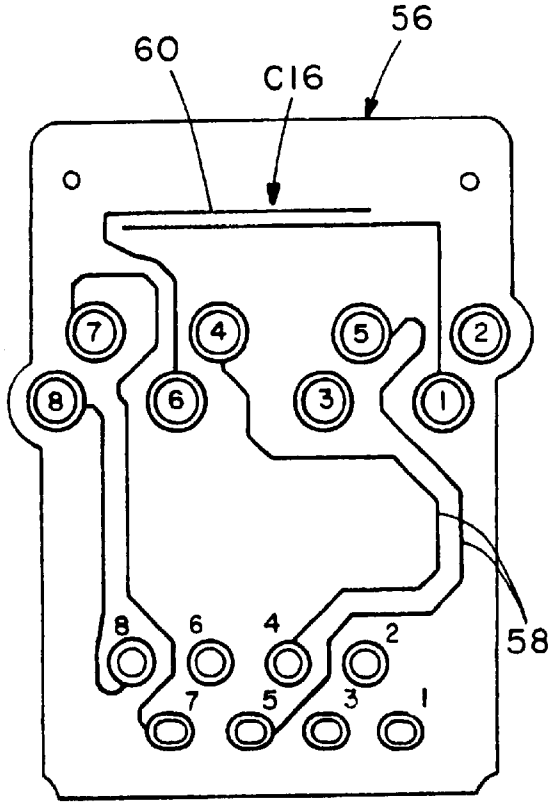
FIG. 15 is a plan view of the bottom layer of the printed circuit board.
Figure 14:
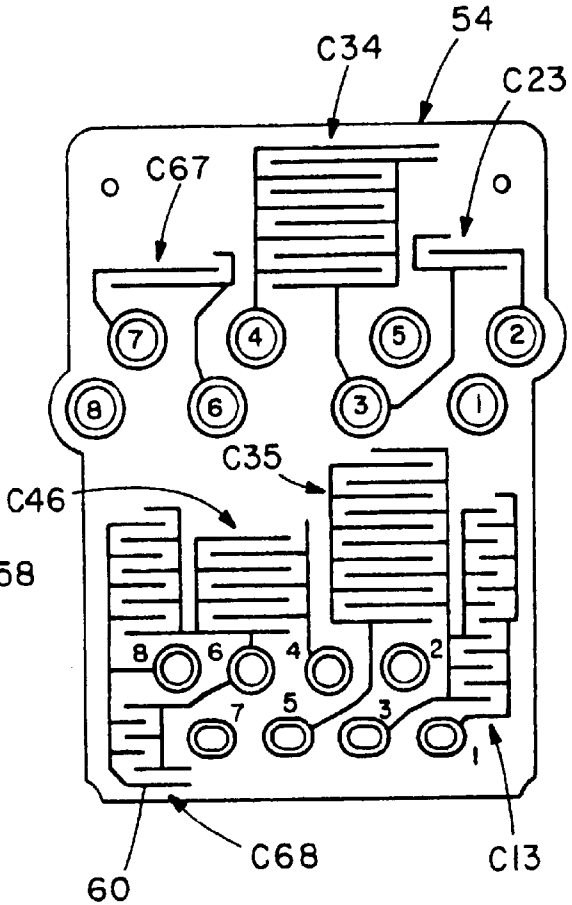
FIG. 14 is a plan view of the second layer which is identical to the third layer of the printed circuit board.
Figure 13:
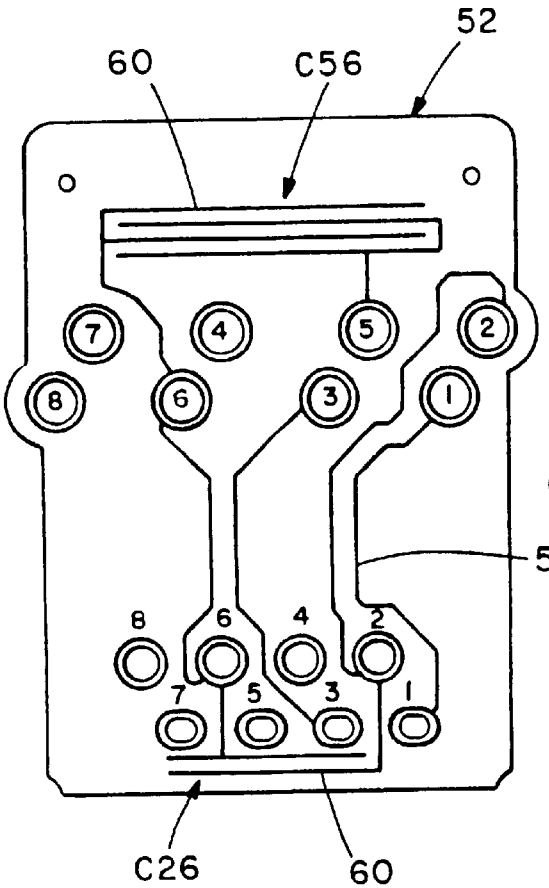
FIG. 13 is a plan view of the top layer of the circuit board.
Figure 16:
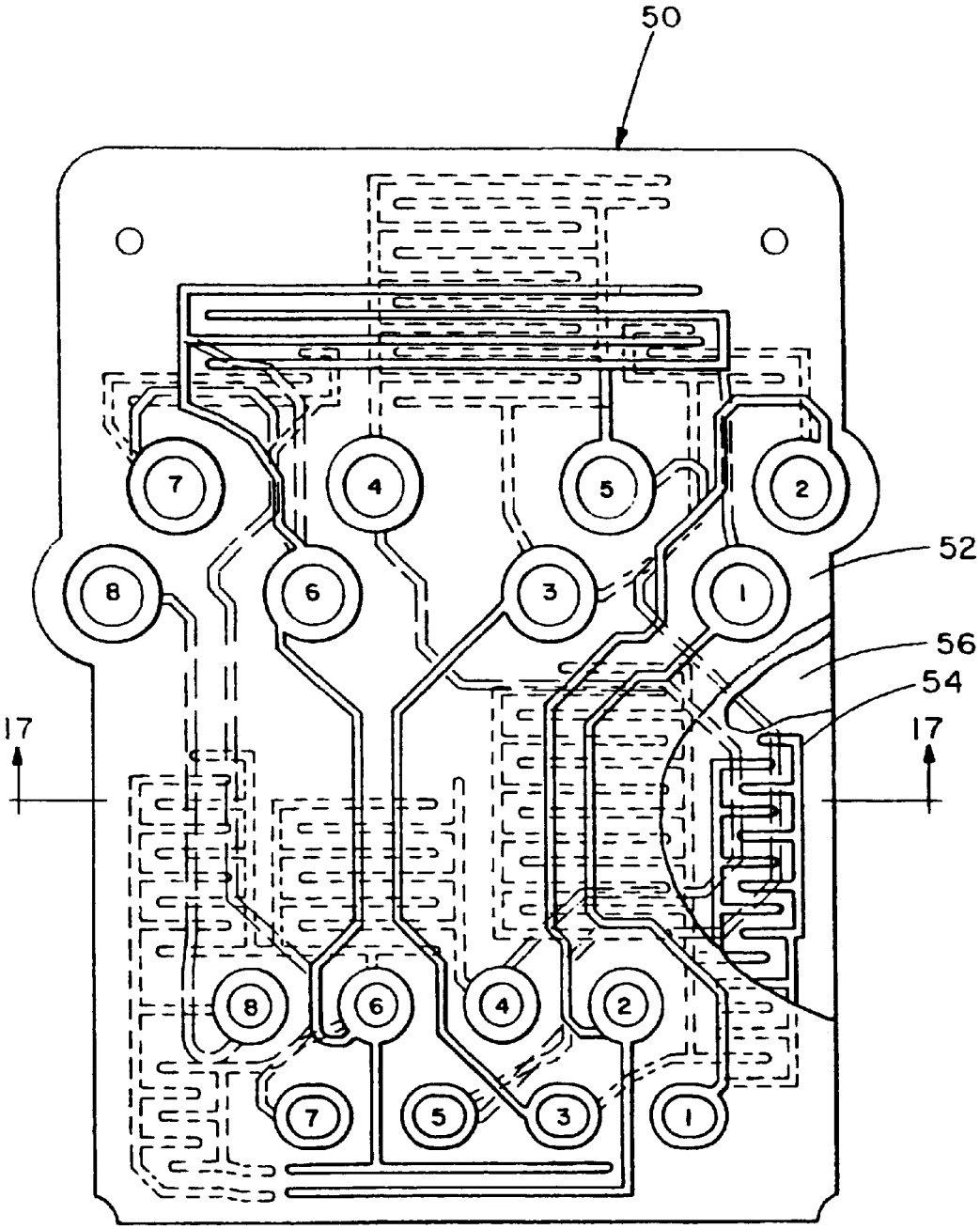
FIG. 16 is a plan view of the PCB with portions broken away to see the lower layers.
Figure 17:
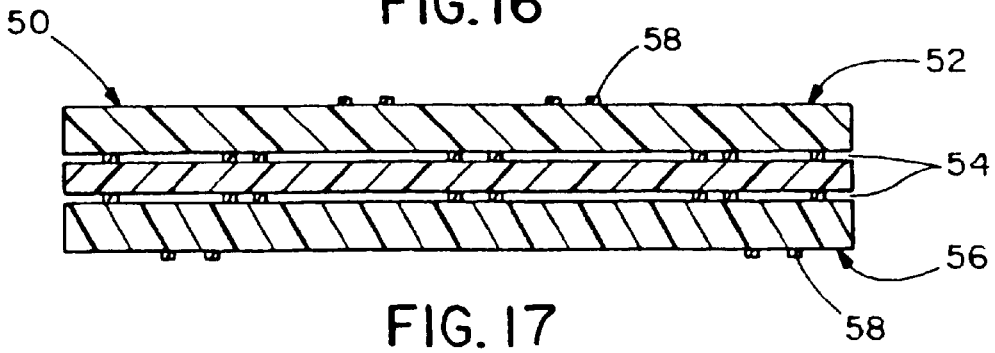
FIG. 17 is a sectional view of the printed circuit board taken along lines 17—17 of FIG. 16.

As can be seen in FIGS. 3–6, connector 10 includes a conductor carrying sled 30 that supports a printed circuit board (PCB) 50 and a first and second plurality of conductors. The first plurality of conductors 32 each have a resilient contact portion 34 at a first end which is to be disposed within the plug receiving opening in accordance with a standard telephone plug mating configuration. The standards for the connector interface provides for eight laterally spaced conductors numbered 1–8, wherein the conductor pairs are defined by the associated wire pairs in accordance with the standard. Specifically, the standard pair arrangement provides for wires 4 and 5 comprising pair 1, wires 3 and 6 comprising pair 2, wires 1 and 2 comprising pair 3, and wires 7 and 8 comprising pair 4. As shown in FIGS. 8 and 12, each of the conductors 32 also includes a compliant pin at the second end so that the conductors 32 can be secured to the PCB 50 without requiring soldering.

Figure 6:
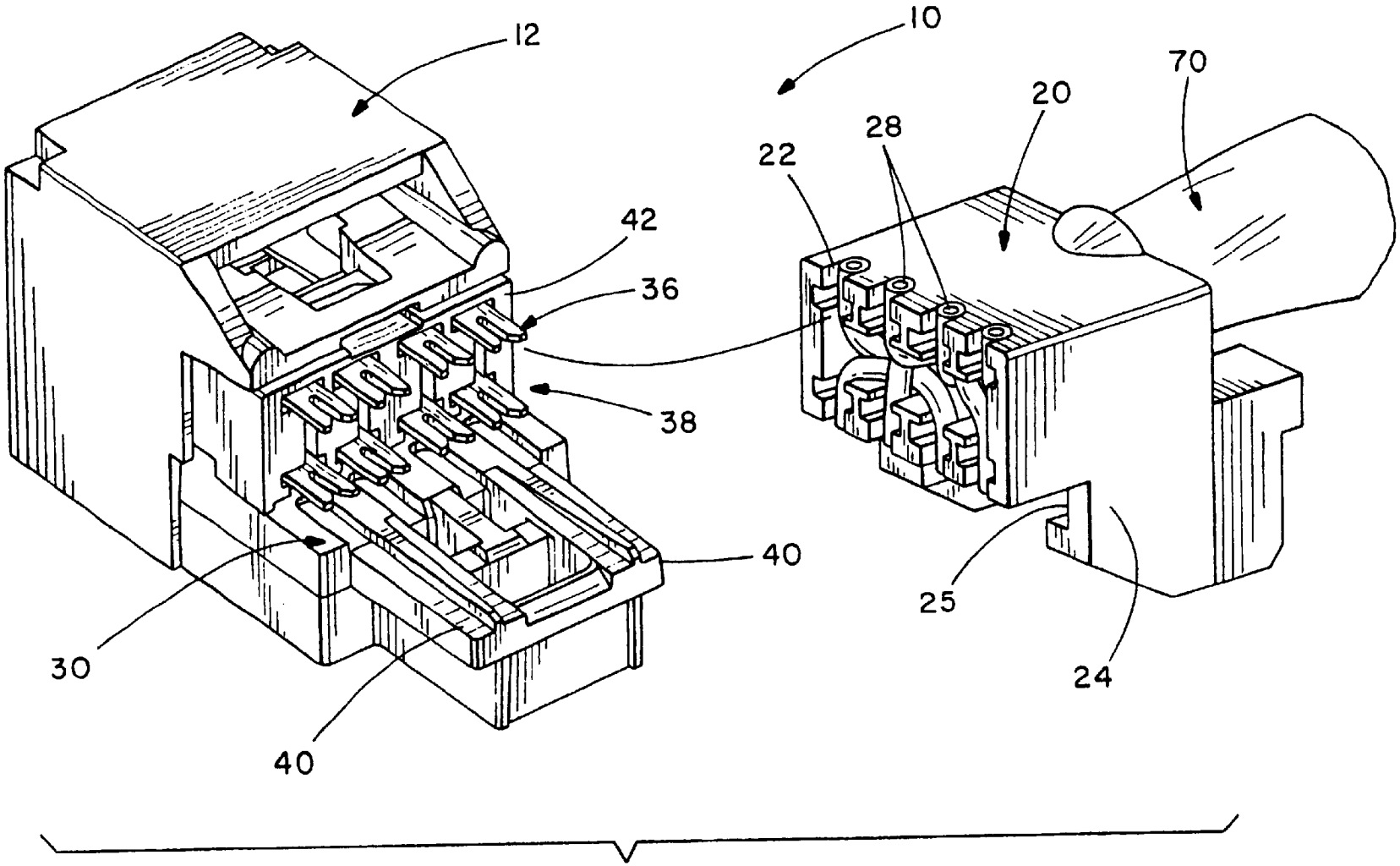
FIG. 6 is a subassembly view of the connector of FIG. 1 shown prior to termination by the wire containment fixture.
Figure 7:
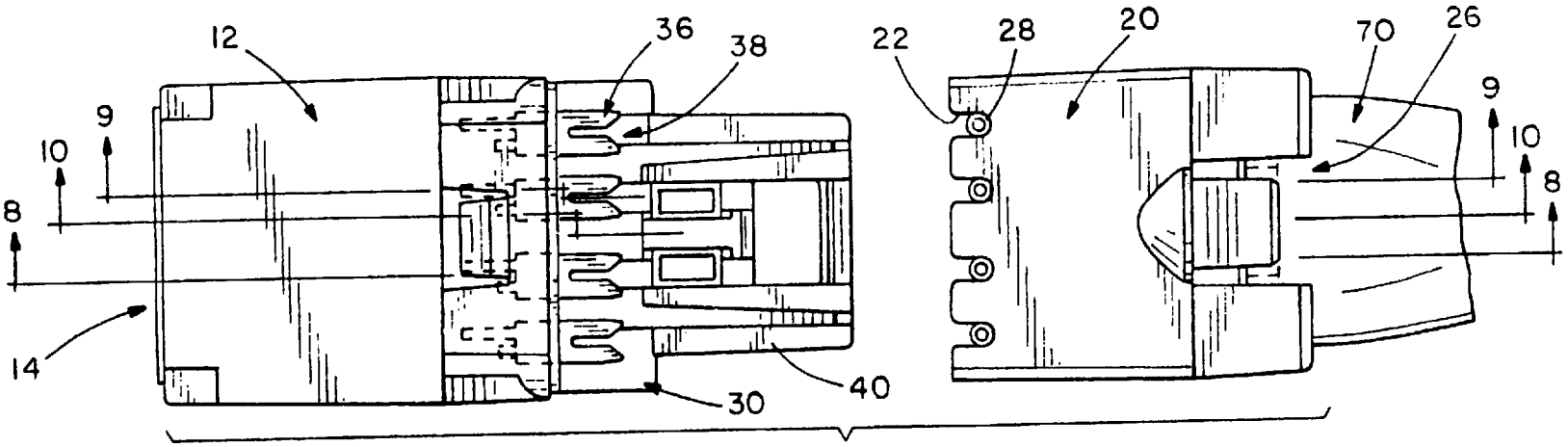
FIG. 7 is a top view of the connector of FIG. 1 shown prior to termination by the wire containment fixture.

The second plurality of conductors 36 each includes a compliant pin at one end for engagement with the PCB 50 and an IDC portion 38 at the second end. The second plurality of conductors 36 are configured such that the IDC portions 38 are disposed extending rearwardly in a direction generally parallel to an axis of entry of the plug receiving opening 14. The axis of entry is the generally horizontal direction in which a standard telephone plug type connector would be inserted in order to mate with the resilient contacts of the connector. The second plurality of conductors are initially loaded into an IDC block 42 which is used to aid in the manufacturing and assembly process. The IDC block 42 has locating pockets and a peg for accurate positioning on the sled 30. After assembling the PCB 50 and conductors 32, 36 in position on sled 30, the sled is inserted into the rear end of the housing such that resilient contact portions 34 of the first plurality of conductors 32 are disposed within the plug receiving opening 14 of housing 12 and the IDC portions 38 extend horizontally away from the back end in position for termination of the individual wires 28 as shown in FIG. 6. Latches on the housing secure the sled in position.

As can be seen in FIGS. 3, 4, 6 and 8, the wire containment fixture 20 has a cable opening 26 that allows both flat and found cable to be loaded into the wire containment fixture. The front end of wire containment fixture 20 includes eight individual vertically aligned wire slots 22. Thus as the twisted pair conductors of the cable are brought through the opening, the individual wires can be routed into their respective wire slots 22. A label indicating the wiring scheme can be placed on the wire containment fixture 20 for providing the user instructions. Engagement walls 24 including guide slots 25 are provided on fixture 20 beneath the wire slots 22 and are formed to engage with a pair of guide rails 40 disposed on each lateral edge of the rearward end of sled 30 to allow for sliding movement of fixture 20 along sled 30 and to provide for proper wire location during termination.

In general, in communications connectors, some crosstalk effect is occurring at every portion along adjacent conductors of the connector. That is, crosstalk occurs between adjacent conductors at the resilient contact portions of the plug mating end, between adjacent contacts on the PCB, as well as between adjacent IDC portions. It is in the preferred embodiment shown that the overall crosstalk performance of the connector is enhanced through a combination of minimizing crosstalk interaction between adjacent conductors where possible and utilizing capacitors on a unique PCB design to balance the overall crosstalk effect.

As can be seen in FIGS. 13–16, the printed circuit board 50 is a four layer board with a plurality of through holes formed through all four layers, each of which corresponds respectively with one of the compliant pin ends of one of the first or second plurality of conductors 32, 36. The top 52 and bottom 56 outer layers contain the traces 58 for interconnecting the first and second plurality of conductors 32, 36 via their respective conductive through holes. The two inner layers 54 are identical to each other and is shown only once in FIG. 14. Seven of the ten capacitors 60 which are utilized in the proposed design for crosstalk reduction are housed in the middle two layers 54. The outer layers 52, 56 also include three capacitors 60 which in the preferred design were not placed in the middle layers 54 due to space and capacitor layout constraints.

As can be seen, the conductor traces 58 within a pair are of relatively the same length and run nearby each other to obtain a proper impedance for return/loss performance and to reduce possible far end crosstalk (FEXT) effect. It is to be noted that the thickness of the traces can also be adjusted to achieve the required impedance. Additionally, certain contact pairs have the traces 58 run on opposite side of the board to minimize is near end crosstalk (NEXT) in that area. For example, traces 4 and 5, and 7 and 8 for pairs 1 and 4 respectively are disposed on the bottom board, whereas traces 3 and 6, and 1 and 2 for pairs 2 and 3 respectively are disposed on the top board.

Capacitance is added to the PCB in order to compensate for the crosstalk which occurs between adjacent conductors of different pairs throughout the connector arrangement. The capacitance can be added in several ways. The capacitance can be added as chips to the board or can be integrated into the board using pads or finger capacitors.

In the preferred embodiment shown, capacitors are added in the form of finger or interdigitated capacitors connected to conductor pairs. The capacitors are identified by the conductor to which they are connected and to which capacitance is added to balance the crosstalk effect seen by the other conductor of a pair. For example, C46 identifies the finger capacitor connected to conductors 4 and 6 to balance the crosstalk seen between conductors 4 and 6 with the crosstalk seen between conductors 5 and 6 throughout the connector.

As can be seen in FIG. 12, the IDC portions 38 for terminating pairs of wires of the communication cable are arranged in two rows of four IDC portions. The contacts are configured such that the top and bottom IDC portion at each end of the rows terminates a wire pair and the two internal IDC portions of each row terminate a wire pair. Specifically, as previously discussed the standard pair arrangement is wires 4 and 5 are pair 1, wires 3 and 6 are pair 2, wires 1 and 2 are pair 3 and wires 7 and 8 are pair 4. The standard in the industry sets forth that the odd wires are the tip and the even wires are the ring of the pair. As best seen in FIG. 12, pair 3 comprising contacts 1 and 2 and pair 4 comprising contacts 7 and 8 are disposed respectively at the left and right ends of the two rows of IDC portions. Pair 2 comprising contacts 3 and 6 is disposed on the upper row at the two internal IDC portions and pair 1 comprising contacts 4 and 5 is disposed in the bottom row within the two inner IDC portions. This specific IDC arrangement improves crosstalk performance by minimizing any additional undesired crosstalk while helping to balance existing crosstalk effects found in the standard plug and jack contact arrangement. Furthermore, this IDC layout allows for pairs to remain twisted as close to the IDC's as possible which helps decrease the crosstalk needed to be balanced in the connector. Thus, the IDC arrangement allows for a simplified PCB capacitor design.

In the field, the preassembled housing 12 and sled 30 containing the printed circuit board 50, first plurality of contacts 32, second plurality of contacts 36 and IDC block 42 is provided such that plug mating resilient contact portions 34 are disposed within the plug receiving opening 14 and the IDC portions 38 are horizontally disposed for accepting the individual wires 28. The communication cable 70 is inserted into the opening 26 of the wire containment fixture 20, the individual wires 28 are inserted into the respective wire slots 22 and the excess wire cut off. Finally, the wire containment 20 having the engagement walls 24 with guide slots 25 is assembled onto sled 30 via the guide rails 40 and slid forward until proper termination is achieved and locked in position by a cantilevered snap latch.

While the particular preferred embodiments of the present invention have been shown and described, it will be obvious to those skilled in the art that changes and modifications may be made without departing from the teachings of our invention. The matter set forth in the foregoing description and accompanying drawings, is offered by way of illustration only and not a limitation. The actual scope of the invention is intended to be defined in the following claims when viewed in their proper perspective based on the prior art.

What is claimed is:

1. A modular communications connector, comprising:

a housing defining a plug receiving opening;

a conductor carrying sled supporting a plurality of conductors each including an insulation displacement contact (IDC) portion having at least a pair of tines disposed extending rearwardly in a direction generally parallel to an axis of entry of the plug receiving opening; and a wire containment fixture having means for positioning wires with respect to the IDC portions, and being engageable to the sled, wherein after engagement with the sled at a first position on the sled, the fixture is slidably movable along a portion of the sled from the first position to a second position along the portion of the sled where wires contained in said wire containment fixture terminate with corresponding IDC portions.

2. The modular communications connector according to claim 1, wherein the fixture includes a pair of engagement walls each including a pair of inwardly disposed flanges forming guide slots for cooperating with a pair of guide rails respectively formed on the sled.

3. The modular communications connector according to claim 1, wherein the sled further supports a printed circuit board (PCB) having means for reducing crosstalk interference between associated pairs of the conductors.

4. The modular communications connector according to claim 3, wherein the printed circuit board includes at least three layers with the outer layers containing a plurality of traces that interconnect a first and second plurality of conductors, and capacitors formed on an inner layer of the PCB that affect crosstalk performance of the connector.

5. The modular communications connector according to claim 1, wherein the sled upon engagement with the housing positions a plurality of resilient contact portions within the plug receiving opening.

6. The modular communications connector according to claim 1, wherein the fixture includes a cable receiving aperture extending through said fixture in a direction generally parallel to the times of the IDC.

7. A modular communications connector, comprising:

a housing defining a plug receiving opening at a first end;

a sled supporting a printed circuit board engageable with the housing;

a first plurality of conductors each having a resilient contact portion at a first end situated within the plug receiving opening and a second end adapted to be connected to the printed circuit board (PCB);

a second plurality of conductors each having a first end adapted to be connected with the PCB and an insulation displacement contact (IDC) portion at a second end; and a wire containment fixture having means for positioning wires with respect to the IDC portions and being engageable to the sled, wherein after engagement with the sled at a first position on the sled, the fixture is slidably moveable along a portion of the sled from the first position to a second position along the portion of the seld where wires contained in said wire containment fixture terminate with corresponding IDC portions.

8. The modular communications connector according to claim 6, wherein the means for positioning wires includes a plurality of vertically aligned wire slots disposed at a front end of the fixture.

9. The modular communications connector according to claim 6, wherein the IDC portions include at least a pair of tines disposed extending rearwardly in a direction generally parallel to an axis of entry of the plug receiving opening.

10. The modular communications connector according to claim 6, wherein the PCB includes means for reducing the crosstalk effect on the conductors.

11. The modular communications connector according to claim 6, wherein the PCB further comprises four layers with a top and a bottom layer including traces interconnecting the first and second plurality of conductors.

12. The modular communications connector according to claim 11, wherein a pair of inner layers include capacitors for reducing the crosstalk effect on the conductors.

13. The modular communications connector according to claim 7, wherein the fixture includes a cable receiving aperture extending through said fixture in a direction generally parallel to the tines of the IDC.

14. A modular communications connector including a housing defining a plug receiving opening having therein a first plurality of conductors each having a portion arranged in accordance with a standard telephone wiring configuration, the connector further comprising:

a second plurality of conductors each having insulation displacement contact (IDC) portions at a first end that terminate pairs of wires of a communication cable and a second end interconnected to a corresponding one of the first plurality of conductors, wherein the IDC portions are arranged in an upper and a lower row of four IDC portions each such that the top and bottom IDC portion at each end of the rows terminates an associated wire pair and the two internal IDC portions of each row terminating an associated wire pair wherein the IDC portions include at least a pair of tines disposed extending rearwardly in a direction generally parallel to an axis of entry of the plug receiving opening said connector further including a conductor carrying sled and a wire containment fixture, wherein the wire containment fixture includes means for positioning wires with respect to the IDC portions, said fixture being engageable to and slidably movable along a portion of the conductor carrying sled.

15. A modular communications connector including a housing defining a plug receiving opening having a first plurality of conductors each having a first end portion arranged in accordance with a standard telephone wiring configuration and a second portion adapted to be connected to a printed circuit board, and a second plurality of conductors having insulation displacement contact (IDC) portions that terminate wires of a communication cable and a second portion adapted to be connected to a printed circuit board, comprising:

a printed circuit board (PCB) engageable with both the first and second plurality of conductors having at least three layers with a pair of outer layers containing a plurality of traces that interconnect individual ones of the first plurality of conductors with a corresponding one of the second plurality of conductors to complete an electrical signal path between the IDC of the corresponding one second plurality of conductors and the first end portion of the corresponding one of the first plurality of conductors; and capacitors formed on an inner layer of the PCB for affecting crosstalk performance of the connector.

16. The modular communications connector according to claim 15, wherein the PCB includes two inner layers both having capacitors formed thereon.

17. The modular communications connector according to claim 16, wherein the two inner layers are identical.

*18. An electrical connector for use with one of a plug and a jack as well as a cable that includes a cable jacket that covers a first portion of multiple pairs of wires, a second portion of the multiple pairs of wires extending beyond the cable jacket, the first portion and the second portion meeting at a junction, the electrical connector comprising:*

*a housing assembly that is engageable with the one of the plug and the jack, the housing assembly including a plurality of connectors that each include an IDC portion; and*

*a wire containment fixture defining an opening that includes an entry end that receives the cable and an exit end, the wire containment fixture further defining a plurality of wire slots adjacent to the exit end of the opening, each of the wire slots being configured to enable one wire of the second portion of one of the multiple pairs of wires to terminate therein, the opening being configured to prevent the cable jack and the junction from extending farther into the opening than a predetermined distance from the entry end, the opening also being configured to enable the second portion of each of the multiple pairs of wires to extend from the junction toward the exit end and to bend in a direction substantially normal to an axis of the opening to terminate in the respective wire slots, the wire containment fixture being engageable with the housing assembly such that the IDC portion of each of the plurality of connections electrically engages one of the wires terminated in one of the plurality of wire slots.*

*19. The electrical connector according to claim 18, the exit end of the opening having a greater dimension in a first plane than in a second plane which is perpendicular to the first plane.*

*20. The electrical connector according to claim 19, the entry end of the opening of the wire containment fixture having a greater dimension in a third plane than in a fourth plane which is perpendicular to the third plane.*

*21. The electrical connector according to claim 19, the wire slots being elongated and extending in a direction that is perpendicular to the first plane.*

*22. The electrical connector according to claim 18, the entry end of the opening of the wire containment fixture being substantially rectangular.*

*23. The electrical connector according to claim 18, the opening of the wire containment fixture being defined in part by a pair of substantially planar interior walls.*

*24. The electrical connector according to claim 23, each wire slot being elongated and extending in a direction that is perpendicular to one of the substantially planar interior walls.*

*25. The electrical connector according to claim 18, the wire containment fixture defining a pair of substantially planar exterior walls.*

*26. The electrical connector according to claim 25, each wire slot being elongated and extending in a direction that is perpendicular to one of the substantially planar exterior walls.*

*27. The electrical connector according to claim 25, one of the planar exterior walls defining exit ends of four wire slots of the plurality of wire slots with no protrusions in the exterior wall between the wire slots.*

*28. The electrical connector according to claim 25, the IDC portions extending in a plane that is parallel to a plane of an exterior surface of the substantially planar exterior wall.*

*29. The electrical connector according to claim 18, at least a portion of the entry end of the opening of the wire containment fixture being arcuate to facilitate insertion of the first portion of the cable.*

*30. The electrical connector according to claim 18, the exit end of the opening of the wire containment fixture being substantially rectangular.*

*31. The electrical connector according to claim 18, the wire slots being contiguous with the opening of the wire containment fixture.*

*32. The electrical connector according to claim 18, an axis of each of the wire slots being normal to an axis of the opening of the wire containment force.*

*33. The electrical connector according to claim 18, the wire containment fixture being configured to enable the second portion of each of the multiple pairs of wires of the cable to be terminated so as to enhance cable strain relief.*

*34. The electrical connector according to claim 18, the wire containment fixture and the housing assembly being engageable with each other by moving one of the wire containment fixture and the housing assembly in a direction toward the other of the wire containment fixture and the housing assembly that is substantially parallel to the axis of the opening.*

*35. The electrical connector according to claim 18, the one of the plug and the jack being engageable with the housing assembly by moving the one of the plug and the jack in a direction toward the housing assembly that is substantially parallel to the axis of the opening.*

*36. The electrical connector according to claim 18, two wire slots of the plurality of wire slots being configured such that one pair of wires of the multiple pairs of wires that terminate therein are of a substantially equal length.*

*37. The electrical connector according to claim 18, two wire slots of the plurality of wire slots being configured such that distances between the respective bends of one pair of wires of the multiple pairs of wires that terminate therein and a portion of the one pair of wires terminated in the two wire slots that engages the IDC portions are equal.*

*38. The electrical connector according to claim 18, an upper surface of one pair of IDC portions that electrically engages one pair of wire extending in substantially the same plane.*

*39. The electrical connector according to claim 18, the exit end of the wire containment fixture having an exterior wall including an upper wall portion and a lower wall portion, the plurality of wire slots being defined in the upper and lower wall portions, wherein a first pair of wires of the multiple pairs of wires is disposed in adjacent wire slots in the upper wall portion, and a second pair of wires of the multiple pairs of wires is disposed in adjacent wire slots in the lower wall portion, and a third and fourth pair of wires of the multiple pairs of wires, each of the third and fourth pair of wires having a wire disposed in a wire slot in the upper wall portion and a wire disposed in a wire slot in the lower wall portion.*

*40. The electrical connector according to claim 18, one pair of wires of the multiple pairs of wires terminating in one pair of wire slots, the one pair of wire slots being adjacent to each other.*

*41. The electrical connector according to claim 18, the exit end of the opening of the wire containment fixture being defined by an exterior wall having an upper wall portion and a lower wall portion, the plurality of wire slots being defined in the upper and lower wall portions, a first pair of wires of the multiple pairs of wires terminating in a first pair of wire slots that are disposed adjacent to each other in the upper*

*wall portion a second pair of wires of the multiple pairs of wires terminating in a second pair of wire slots that are disposed adjacent to each other in the lower wall portion.*

*42. The electrical connector according to claim 18, the exit end of the opening of the wire containment fixture being defined by an exterior wall having an upper wall portion and a lower wall portion, the plurality of wire slots being defined in the upper and lower wall portions, one wire of a first pair of wires of the multiple pairs of wires terminating in a wire slot that is disposed in the upper wall portion, the second wire of the first pair of wires terminating in a wire slot that is disposed in the lower wall portion.*

*43. The electrical connector according to claim 42, the wire slots in which the first pair of wires terminate having a common axis.*

*44. The electrical connector according to claim 18, the housing assembly including a printed circuit board, the plurality of IDC portions being connected to the printed circuit board.*

*45. The electrical connector according to claim 43, the printed circuit board including multiple layers.*

*46. The electrical connector according to claim 18, the housing assembly including a housing that is engageable with the one of the plug and the jack, the housing assembly also including a guide member affixed to the housing, the guide member defining IDC apertures through which the IDC portions extend, and including projections adjacent to each IDC aperture which clamps each terminated wire against a bottom of the wire slot in which each wire is terminated.*

*47. The electrical connector according to claim 18, the multiple pairs of wires of the cable including four twisted pairs of wires, the plurality of IDC portions including eight IDC portions, and the plurality of wire slots including eight wire slots.*

*48. The electrical connector according to claim 18, the one of the plug and the jack including IDC portions, each IDC portion corresponding to one wire slot of the plurality of wire slots.*

*49. The electrical connector according to claim 18, the exit end of the wire containment fixture having an exterior wall including a left wall portion and a right wall portion, the plurality of wire slots being defined in the left and right wall portions, wherein a first pair of wires of the multiple pairs of wires is disposed in adjacent wire slots in the left wall portion, and a second pair of wires of the multiple pairs of wires is disposed in adjacent wires slots in the right wall portion, and a third and fourth pair of wires of the multiple pairs of wires, each of the third and fourth pair of wires having a wire disposed in a wire slot in the left wall portion and a wire disposed in a wire slot in the right wall portion.*

*50. The electrical connector according to claim 18, the wire containment fixture defining planar exterior walls defining the exit end of the plurality of wire slots, said planar exterior walls being configured with no protrusions to facilitate removal of excess wire extending from the exit end of the wire slots.*

*51. A method of providing electrical connection between one of a plug and a jack and a cable that includes a cable jacket that covers a first portion of multiple pairs of wires, a second portion of the multiple pairs of wires extending beyond the cable jacket, the first portion and the second portion meeting at a junction, the method comprising:*

*engaging a housing assembly with the one of the plug and the jack, the housing assembly including a plurality of connectors that each include an IDC portion;*

*receiving the cable in an entry end of an opening defined in a wire containment fixture;*

*preventing the cable jacket and the junction from extending farther into the opening than a predetermined distance from the entry end such that the second portion of the multiple pairs of wires of the cable extend through a majority of a depth of the cable opening;*

*terminating the second portion of the multiple pairs of wires in a plurality of wire slots desired in the wire containment fixture adjacent an exit end of the opening; and*

*engaging the housing assembly with the wire containment fixture such that the IDC portions of each of the plurality of connectors electrically engages one of the wires terminated in one of the plurality of wire slots.*

*52. The method according to claim 49, further including extending the second portion of each of the multiple pairs of wires from the junction toward the exit end of the opening, and subsequently bending the second portion of the multiple pairs of wires in a direction substantially normal to an axis of the opening to terminate in the respective wire slots.*

*53. The method according to claim 52, further including extending the second portion of one pair of the multiple pairs of wires from the junction toward the exit end of the opening to a location adjacent to the pair of wire slots in which the one pair of wires terminates.*

*54. The method according to claim 53, further including extending the second portion of the multiple pairs of wires from the junction toward the exit end of the opening to locations substantially adjacent to the wire slots in which the multiple pairs of wires terminates.*

*55. The method according to claim 51, further including extending the second portion of each of the multiple pairs of wires of the cable through the opening so as to reduce crosstalk between the multiple pairs of wires.*

*56. The method according to claim 51, further including extending the second portion of each of the multiple pairs of wires of the cable through the opening so as to enhance cable strain relief.*

*57. An electrical connector for use with one of a plug and a jack as well as a cable that includes a cable jacket that covers a first portion of multiple pairs of wires, a second portion of the multiple pairs of wires extending beyond the cable jacket, the first portion and the second portion meeting at a junction, the electrical connector comprising:*

*a housing assembly that is engageable with the one of the plug and the jack, the housing assembly including a plurality of IDC portions; and*

*a wire containment fixture defining an opening that includes an entry end that receives the cable and an exit end, the wire containment fixture further defining a plurality of wire slots adjacent to the exit end of the opening, the plurality of wire slots defining axes that are all parallel to each other, each of the wire slots being configured to enable one wire of the second portion of one of the multiple pairs of wires to terminate therein, the opening being configured to enable the second portion of each of the multiple pairs of wires to extend from the junction toward the exit end and to bend in a direction substantially normal to an axis of the opening to terminate in the respective wire slots, the wire containment fixture being engageable with the housing assembly such that each IDC portion electrically engages one of the wires terminated in one of the plurality of wire slots.*

*58. The electrical connector according to claim 57, the exit end of the opening having a greater dimension in a first plane than in a second plane which is perpendicular to the first plane.*

*59. The electrical connector according to claim 58, the entry end of the opening of the wire containment fixture having a greater dimension in a third plane than a fourth plane which is perpendicular to the third plane.*

*60. The electrical connector according to claim 56, the wire slots being elongated and extending in a direction that is perpendicular to the first plane.*

*61. The electrical connector according to claim 57, the exit end of the opening of the wire containment fixture being substantially rectangular.*

*62. The electrical connector according to claim 57, the wire containment fixture defining a pair of substantially planar exterior walls.*

*63. The electrical connector according to claim 62, each wire slot being elongated and extending in a direction that is perpendicular to one of the substantially planar exterior walls.*

*64. The electrical connector according to claim 57, the wire containment fixture defining planar exterior walls defining the exit end of the plurality of wire slots, said planar exterior walls being configured with no protrusions to facilitate removal of excess wire extending from the exit end of the wire slots.*

*65. The electrical connector according to claim 62, one of the planar exterior walls defining exit ends of four wire slots of the plurality of wire slots with no protrusion in the exterior wall between the wire slots.*

*66. The electrical connector according to claim 62, the IDC portions extending in a plane that is parallel to a plane of an exterior surface of the substantially planar exterior wall.*

*67. The electrical connector according to claim 57, at least a portion of the entry end of the opening of the wire containment fixture being arcuate to facilitate insertion of the first portion of the cable.*

*68. The electrical connector according to claim 57, the wire slots being contiguous with the opening of the opening of the wire containment fixture.*

*69. The electrical connector according to claim 57, an axis of each of the wire slots being normal to an axis of the opening of the wires containment fixture.*

*70. The electrical connector according to claim 57, the wire containment fixture being configured to enable the second portion of each of the multiple pairs of wires of the cable to be terminated so as to enhance cable strain relief.*

*71. The electrical connector according to claim 57, the wire containment fixture and the housing assembly being engageable with each other by moving one of the wire containment fixture and the housing assembly in a direction toward the other of the wire containment fixture and the housing assembly that is substantially parallel to the axis of the opening.*

*72. The electrical connector according to claim 57, the one of the plug and the jack being engageable with the housing assembly by moving the one of the plug and the jack in a direction toward the housing assembly that is substantially parallel to the axis of the opening.*

*73. The electrical connector according to claim 57, two wire slots of the plurality of wire slots being configured such that one pair of wires of the multiple pairs of wires that terminate therein are of a substantially equal length.*

*74. The electrical connector according to claim 57, two wire slots of the plurality of wire slots being configured such that distances between the respective bends of one pair of wires of the multiple pairs of wires that terminate therein and a portion of the one pair of wires terminated in the two wire slots that engages the IDC portions are equal.*

*75. The electrical connector according to claim 57, an upper surface of one pair of IDC portions that electrically engages one pair of wires extending in substantially the same plane.*

*76. The electrical connector according to claim 57, the entry end of the opening of the wire containment fixture being substantially rectangular.*

*77. The electrical connector according to claim 57, one pair of wires of the multiple pairs of wires terminating in one pair of wire slots, the one pair of wire slots being adjacent to each other.*

*78. The electrical connector according to claim 57, the exit end of the opening of the wire containment fixture being defined by an exterior wall having an upper wall portion and a lower wall portion, the plurality of wire slots being defined in the upper and lower wall portions, a first pair of wires of the multiple pairs of wires terminating in a first pair of wire slots that are disposed adjacent to each other in the upper wall portion, a second pair of wires of the multiple pairs of wires terminating in a second pair of wire slots that are disposed adjacent to each other in the lower wall portion.*

*79. The electrical connector according to claim 57, the exit end of the opening of the wire containment fixture being defined by an exterior wall having an upper wall portion and and a lower wall portion, the plurality of wire slots being defined in the upper and lower wall portions, one wire of a first pair in the upper and lower wall portions, one wire of a first pair of wires of the multiple pairs of wires terminating in a wire slot that is disposed in the upper wall portion, the second wire of the first pair of wires terminating in a wire slot that is disposed in the lower wall portion.*

*80. The electrical connector according to claim 79, the wire slots in which the first pair of wires terminate having a common axis.*

*81. The electrical connector according to claim 57, the housing assembly including a printed circuit board, the plurality of IDC portions being connected to the printed circuit board.*

*82. The electrical connector according to claim 81, the printed circuit board including multiple layers.*

*83. The electrical connector according to claim 55, the housing assembly including a housing that is engageable with the one of the plug and the jack, the housing assembly also including a guide member affixed to the housing, the guide member defining IDC apertures through which the IDC portions extend, and including projections adjacent to each IDC aperture which clamps each terminated wire against a bottom of the wire slots in which each wire is terminated.*

*84. The electrical connector according to claim 57, the multiple pairs of wires of the cable including four twisted pairs of wires, the plurality of IDC portions including eight IDC portions, and the plurality of wire slots including eight wire slots.*

*85. The electrical connector according to claim 57, the one of the plug and the jack including IDC portions, each IDC portion corresponding to one wire slot of the plurality of wire slots.*

*86. The electrical connector according to claim 57, the opening of the wire containment fixture being defined in part by a pair of substantially planar interior walls.*

*87. The electrical connector according to claim 86, each wire slot being elongated and extending in a direction that is perpendicular to one of the substantially planar interior walls.*

*88. The electrical connector according to claim 60, the exit end of the wire containment fixture having an exterior*

*wall including an upper wall portion and a lower wall portion, the plurality of wire slots being defined in the upper and lower wall portions, wherein a first pair of wires of the multiple pairs of wires is disposed in adjacent wire slots in the upper wall portion, and a second pair of wires of the multiple pairs of wires is disposed in adjacent wire slots in the lower wall portion, and a third and fourth pair of wires of the multiple pairs of wires, each of the third and fourth pair of wires having a wire disposed in a wire slot in the upper wall portion and a wire disposed in a wire slot in the lower wall portion.*

*89. The electrical connector according to claim 57, the exit end of the wire containment fixture having an exterior wall including a left wall portion and a right wall portion, the plurality of wire slots being defined in the left and right wall portions, wherein a first pair of wires of the multiple pairs of wires is disposed in adjacent wire slots in the left wall portion, and a second pair of wires of the multiple pairs of wires is disposed in adjacent wire slots in the right wall portion, and a third and fourth pair of wires of the multiple pairs of wires, each of the third and fourth pair of wires having a wire disposed in a wire slot in the left wall portion and a wire disposed in a wire slot in the right wall portion.*

*90. An electrical connector for use with one of a plug and a jack as well as a cable that includes a cable jacket that covers a first portion of multiple pairs of wires, a second portion of the multiple pairs of wires extending beyond the cable jacket, the first portion and the second portion meeting at a junction, the electrical connector comprising:*

*a housing assembly that is engageable with the one of the plug and the jack, the housing assembly including a plurality of IDC portions; and*

*a wire containment fixture defining an opening that includes an entry end that receives the cable and an exit end, the wire containment fixture further defining a plurality of wire slots adjacent to the exit end of the opening, each of the wire slots being configured to enable one wire of the second portion of one of the multiple pairs of wires to terminate therein, the opening being configured to enable the second portion of each of the multiple pairs of wires to extend from the junction to a location adjacent to the pair of wire slots in which the pair of wires will be terminated regardless of the relative orientation of the twisted pairs in the first portion of the cable and the pairs of wire slots, the opening being configured to enable each wire of each of the multiple pairs of wires to bend in a direction substantially normal to an axis of the opening and to be routed on a straight path from the bend into and through its respective wire slot, the wire containment fixture being engageable with the housing assembly such that each IDC, portion electrically engages one of the wires terminated in one of the plurality of wire slots.*

*91. The electrical connector to claim 90, the exit end of the opening having a greater dimension in a first plane than in a second plane which is perpendicular to the first plane.*

*92. The electrical connector according to claim 91, the wire slots being elongated and extending in a direction that is perpendicular to the first plane.*

*93. The electrical connector according to claim 90, the wire containment fixture defining a pair of substantially planar exterior walls.*

*94. The electrical connector according to claim 93, each wire slot being elongated and extending in a direction that is perpendicular to one of the substantially planar exterior walls.*

*95. The electrical connector according to claim 93, one of the planar exterior walls defining exit ends of four wire slots of the plurality of wire slots with no protrusions in the exterior wall between the wire slots.*

*96. The electrical connector according to claim 93, the IDC portions extending in the a plane that is parallel to a plane of an exterior surface of the substantially planar exterior wall.*

*97. The electrical connector according to claim 90, at least a portion of the entry end of the opening of the wire containment fixture being arcuate to facilitate insertion of the first portion of the cable.*

*98. The electrical connector according to claim 90, the entry end of the opening of the wire containment fixture having a greater dimension in a third plane than in a fourth plane which is perpendicular to the third plane.*

*99. The electrical connector according to claim 90, the wire slots being continuous with the opening of the wire containment fixture.*

*100. The electrical connector according to claim 92, an axis of each of the wire slots being normal to an axis of the opening of the wire containment fixture.*

*101. The electrical connector according to claim 90, the wire containment fixture being configured to enable the second portion of each of the multiple pairs of wires of the cable to be terminated so as to enhance cable strain relief.*

*102. The electrical connector according to claim 90, the wire containment fixture and the housing assembly being engageable with each other by moving one of the wire containment fixture and the housing assembly in a direction toward the other of the wire containment fixture and the housing assembly that is substantially parallel to the axis of the opening.*

*103. The electrical connector according to claim 90, the one of the plug and the jack being engageable with the housing assembly by moving the one of the plug and the jack in a direction toward the housing assembly that is substantially parallel to the axis of the opening.*

*104. The electrical connector according to claim 90, two wire slots of the plurality of wire slots being configured such that one pair of wires of the multiple pairs of wires that terminate therein are of a substantially equal length.*

*105. The electrical connector according to claim 90, two wire slots of the plurality of wire slots being configured such that distances between the respective bends of one pair of wires of the multiple pairs of wires that terminate therein and a portion of the one pair of wires terminated in the two wire slots that engages the IDC portions are equal.*

*106. The electrical connector according to claim 90, an upper surface of one pair of IDC portions that electrically engages one pair of wires extending in substantially the same plane.*

*107. The electrical connector according to claim 90, the exit end of the opening of the wire containment fixture being substantially rectangular.*

*108. The electrical connector according to claim 90, one pair of wires of the multiple pairs of wires terminating in one pair of wire slots, the one pair of wire slots being adjacent to each other.*

*109. The electrical connector according to claim 90, the exit end of the opening of the wire containment fixture being defined by an exterior wall having an upper wall portion and a lower wall portion, the plurality of wire slots being defined in the upper and lower wall portions, a first pair of wires of the multiple pairs of wires terminating in a first pair of wire slots that are disposed adjacent to each other in the upper wall portion, a second pair of wires of the multiple pairs of wires terminating in a second pair of wire slots that are disposed adjacent to each other in the lower wall portion.*

*110. The electrical connector according to claim 90, the exit end of the opening of the wire containment fixture being defined by an exterior wall having an upper wall portion and a lower wall portion, the plurality of wire slots being defined in the upper and lower wall portions, one wire of a first pair of wires of the multiple pairs of wires terminating in a wire slot that is disposed in the upper wall portion, the second wire of the first pair of wires terminating in a wire slot that is disposed in the lower wall portion.*

*111. The electrical connector according to claim 110, the wire slots in which the first pair of wire terminate having a common axis.*

*112. The electrical connector according to claim 90, the housing assembly including a printed circuit board, the plurality of IDC portions being connected to the printed circuit board.*

*113. The electrical connector according to claim 111, the printed circuit board including multiple layers.*

*114. The electrical connector according to claim 90, the housing assembly including a housing that is engageable with the one of the plug and the jack, the housing assembly also including a guide member affixed to the housing, the guide member defining IDC apertures through which the IDC portions extend, and including projections adjacent to each IDC aperture which clamps each terminated wire against a bottom of the wire slot in which each wire is terminated.*

*115. The electrical connector according to claim 90, the multiple pair of wires of the cable including four twisted pairs of wires, the plurality of IDC portions including eight IDC portions, and the plurality of wire slots including eight wire slots.*

*116. The electrical conduit according to claim 90, the one of the plug and the jack including IDC portions, each IDC portion corresponding to one wire slot of the plurality of wire slots.*

*117. The electrical connector according to claim 90, the exit end of the wire containment fixture having an exterior wall including an upper wall portion and a lower wall portion, the plurality of wire slots being defined in the upper and lower wall portions, wherein a first pair of wires of the multiple pairs of wires is disposed in adjacent wire slots in the upper wall portion, and a second pair of wires of the multiple pairs of wires is disposed in adjacent wire slots in the lower wall portion, and a third and fourth pair of wires of the multiple pairs of wires, each of the third and fourth pair of wires having a wire disposed in a wire slot in the upper wall portion and a wire disposed in a wire slot in the lower wall portion.*

*118. The electrical connector according to claim 86, the exit end of the wire containment fixture having an exterior wall including a left wall portion and a right wall portion, the plurality of wire slots being defined in the left and right wall portions, wherein a first pair of wires of the multiple pairs of wires is disposed in adjacent wire slots in the left wall portion, and a second pair of wires of the multiple pairs of wires is disposed in adjacent wire slots in the right wall portion, and a third and fourth pair of wires of the multiple pairs of wires, each of the third and fourth pair of wires having a wire disposed in a wire slot in the left wall portion and a wire disposed in a wire slot in the right wall portion.*

*119. The electrical connector according to claim 90, the entry end of the opening of the wire containment fixture being substantially rectangular.*

*120. The electrical connector according to claim 90, the opening of the wire containment fixture being defined in part by a pair of substantially planar interior walls.*

*121. The electrical connector according to claim 120, each wire slot being elongated and extending in a direction that is perpendicular to one of the substantially planar interior walls.*

*122. The electrical connector according to claim 90, the wire containment fixture defining planar exterior walls defining the exit end of the plurality of wire slots, said planar exterior walls being configured with no protrusions to facilitate removal of excess wire extending from the exit end of the wire slots.*

* * * * *

UNITED STATES PATENT AND TRADEMARK OFFICE

CERTIFICATE OF CORRECTION

PATENT NO. : RE 38,519 E
DATED : May 18, 2004
INVENTOR(S) : Michael Doorhy et al.

It is certified that error appears in the above-identified patent and that said Letters Patent is hereby corrected as shown below:

Column 7,
Line 20, change “jack” to -- jacket --; and
Line 30, change “connections” to -- connectors --.

Column 8,
Line 13, change “force” to -- fixture --.

Column 9,
Line 1, after “portion”, insert -- , --.
Line 19, change “43” to -- 44 --.

Column 10,
Line 7, change “desired” to -- defined --.
Line 14, change “49” to -- 51 --.

Column 11,
Line 5, change “56” to -- 58 --.
Line 26, change “protrusion” to -- protrusions --.
Line 37, delete “of the opening”.
Line 41, change “wires” to -- wire --.

Column 12,
Lines 26-27, delete “one wire of a first pair in the upper and lower wall portions,”.
Line 41, change “55” to -- 57 --; and
Line 48, change “slots” to -- slot --.
Line 66, change “60” to -- 57 --.

Column 13,
Line 51, after “IDC”, delete “,”.

Column 14,
Line 16, change “continuous” to -- contiguous --
Line 18, change “92” to -- 90 --.

UNITED STATES PATENT AND TRADEMARK OFFICE

CERTIFICATE OF CORRECTION

PATENT NO. : RE 38,519 E
DATED : May 18, 2004
INVENTOR(S) : Michael Doorhy et al.

It is certified that error appears in the above-identified patent and that said Letters Patent is hereby corrected as shown below:

Column 15,
Line 11, change “wire” (second occurrence) to -- wires --.
Line 17, change “111” to -- 112 --.
Line 33, change “conduit” to -- connector --.

Column 16,
Line 11, change “86” to -- 90 --.

Signed and Sealed this

Seventeenth Day of August, 2004

JON W. DUDAS
*Acting Director of the United States Patent and Trademark Office*